April 22, 1958     M. G. JACOBSON     2,831,351
ELECTRICAL SYSTEM FOR MEASURING THE RATE OF MOTION OF A FLUID
Original Filed July 29, 1948
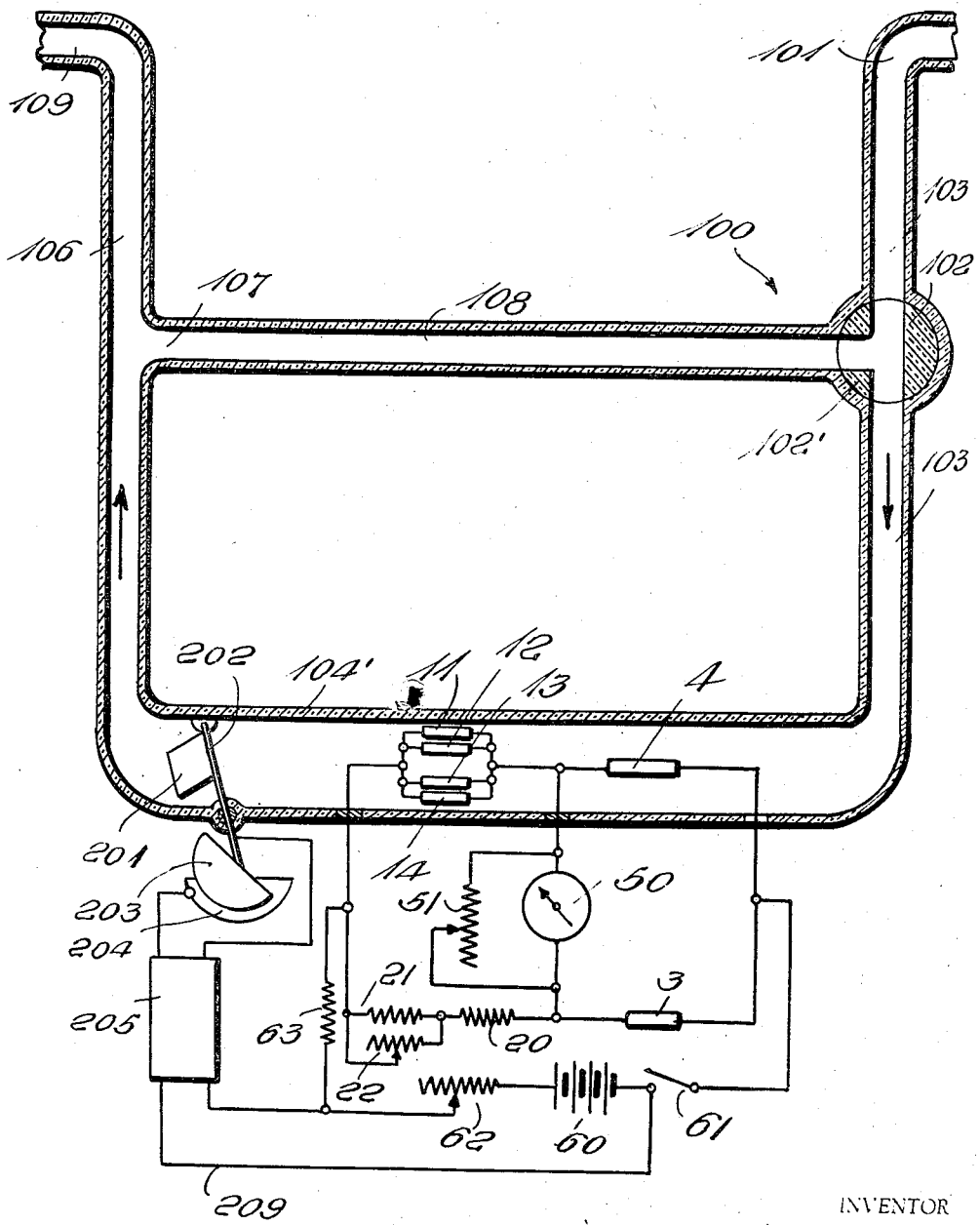
INVENTOR
Moses G. Jacobson,
BY
John B. Brady
ATTORNEY

United States Patent Office 2,831,351
Patented Apr. 22, 1958

2,831,351
ELECTRICAL SYSTEM FOR MEASURING THE RATE OF MOTION OF A FLUID

Moses G. Jacobson, Penn Township, Allegheny County, Pa., assignor to Mine Safety Appliances Company, Pittsburgh, Pa., a corporation of Pennsylvania Original application July 29, 1948, Serial No. 41,347, now Patent No. 2,694,928, dated November 23, 1954. Divided and this application November 18, 1954, Serial No. 469,721

6 Claims. (Cl. 73—204)

My invention relates broadly to measuring systems and devices for the measurement of the rate of flow of fluids by electrical means and more specifically by the method of observing the change in electrical resistance of an electrically heated conductor when cooled by the fluid flow.

This application is a division of my application Serial Number 41,347 filed July 29, 1948, now Patent No. 2,694,928, for Electrical System for Measuring the Rate of Motion of a Fluid.

One object of my invention is to define the conditions for thermally sensitive resistance elements which will provide the largest possible range in the measurement of the rates of fluid flow using a single instrument.

Another object of my invention is to provide a thermally sensitive resistance element which will combine high sensitivity with the smallest possible lag in indication.

Still another object of my invention is to provide in instruments of this class a close approach to a straight line calibration, combined with a large range of fluid flow rates.

A further object of this invention is to make the flow rate indications independent not only of changes in ambient temperature, but also of changes in the temperature of the fluid, whose flow is being measured.

Another object of this invention is to provide the characteristics and conditions for resistance elements with negative temperature coefficients of resistance to make them usable as hot conductor fluid flow rate detectors.

A still further object of my invention is to provide a circuit arangement in a system for measuring the rate of motion of a fluid wherein the power input to a detector system or to a part thereof may be varied in proportion to the flow of the fluid over a detector element and a temperature compensator assembly arranged in the flow path of the fluid and connected in a balanced electrical circuit containing indicator means responsive to the varying information supplied by the detector element and temperature compensator assembly.

Other and further objects of my invention reside in an improved flow system, in a novel combination of electrical circuit elements and in a novel arrangement of the electrical elements in the various parts of said flow system as set forth more fully in the specification hereafter following by reference to the accompanying drawing which diagrammatically and schematically shows the measuring system of my invention applied to an anemometer or flowmeter showing the temperature sensitive electrical elements arranged in the path of fluid flow and connected through a balanced Wheatstone bridge circuit with a measuring meter, and illustrating particularly one form of means I provide for governing the power input to the detector element by controlling the power input to the Wheatstone bridge circuit or a part thereof, or by changing a parameter of the bridge circuit substantially in proportion to the fluid flow.

My invention is directed to an improved apparatus, and circuit arrangement, employing preferably thermally sensitive resistors, known under various names such as negative temperature coefficient resistors, thermistors, etc. They all belong to the class of semi-conductors and are made of oxides and sometimes sulfides of various metals; their most remarkable properties are as follows:

(1) Their temperature coefficients of resistance are very large, for some of them as much as ten times higher than that of the highest known coefficient for metals. Hence, the resistance change produced by the same temperature change will be ten times higher for these materials than for the most sensitive metal element of the same resistance.

(2) The temperature coefficient of resistance of these materials is negative; that is, while the electrical resistance of all pure metals and most alloys increases with temperature, the resistance of these elements decreases with temperature.

(3) Their thermal resistance coefficient is not constant, but in most cases decreases considerably with temperature, while the coefficients of metals usually increase with temperature but slowly.

While the first of the above properties is ideal for use of these resistors as detector elements in flowmeters and anemometers of the hot conductor type, property two puts them somewhat at a disadvantage for this application: the sensitivity of resistivity of resistance measurments in a Wheatstone bridge or a similar balanced circuit depends on the ratio of the temperature derivative of the resistance $dR/dt$ to the resistance $R$ itself (that is on $dR/dt/R$), and thus, if the resistance coefficient had a constant negative value no matter how large, the absolute value of the sensitivity would rapidly decrease as the temperature of the detector element is decreased, when cooled by the moving fluid. This would result in a very short range for a flowmeter or anemometer using such an element, and the larger the absolute value of the resistance coefficient, the shorter the useful range would be, even though the sensitivity would be much higher.

Fortunately, according to the third property, the resistance coefficients of the semi-conductors are not constant, and in most cases decrease as the temperature goes up and increase as the temperature is lowered; moreover, in spite of the fact that their resistance increases with increased cooling (produced by fluid flow or otherwise), there are among these materials, many, for which the absolute value of the ratio $dR/dt/R$ (which I shall call the temperature sensitivity of resistance) increases with cooling not only as much but considerably more than in the case of materials with positive resistance coefficients.

However, as my researches have established, to have the ratio $dR/dt/R$ increase as much or a little more, than in the case of metals, is not sufficient for a practical application of a semi-conductor as a flowmeter or anemometer.

According to the most accepted terminology the temperature coefficient of resistance is defined as the resistance increment per degree centrigrade divided by the resistance at 0° C., that is $\alpha = (R_t - R_0)/t/R_0$. However, frequently the ratio $dR/dt/Rt$ or $\Delta R/\Delta t/Rt$ is called the temperature coefficient of resistance and also is designated as $\alpha$. To avoid confusion I shall designate the ratio $dR/dt/Rt$ or its practical equivalent $\Delta R/\Delta t/Rt$ and term it the temperature sensitivity $S$ of the resistance $R$ at temperature $t$, which must fulfill certain conditions.

In order to explain the theory of my invention I shall refer to the basic physical principles involved in the operation of a hot conductor flowmeter. The resistance element of my hot conductor flowmeter inserted in the fluid medium is usually heated by electrical current, to a predetermined initial temperature at which the resistance reaches a certain value when the fluid is at rest. Usually at this point, the variable resistance element is balanced against one or more constant resistors included together with the variable element in a Wheatstone bridge or a similar network, and the electric indicating meter also included in the network is on zero. Consider, for example, that the variable resistor element is in this condition at a temperature of 125° C. and the fluid is set into motion. The cooling produced when the fluid just starts to move, will at a first approximation take place according to Newton's law, that is, it will be proportional to 125° C.—the temperature of the moving fluid; if the latter is 25°, for example, then the cooling at the start of the fluid motion will be proportional to 125°—25°; let it be assumed that the flow at first is 50 cc. per minute, and that it cooled the resistor to 110° C. and produced a deflection on the meter of 25 divisions. If the fluid flow is now increased to 100 cc. per minute, the cooling at the start of the increase will no longer be proportional, to 125°—25°=100 but only to 110—25=85, and will further decrease as the flow increases. Hence, if the resistance element has a constant temperature sensitivity (S), the deflection for the second 50 cc. per minute will not be any more 25 but only of the order of 21.25 and the total deflection for 100 cc./min. flow will be only 46.25. As the flow is increased and the temperature of the sensitive resistance element approaches that of the fluid itself, the increments of the deflection become smaller and smaller, and the meter response curve bends over and approaches a line parallel to the abscissa axis.

However, if the resistance element has a temperature sensitivity of resistance that rises considerably with decrease of temperature, the decrease of the subsequent deflections is more or less counteracted, depending on how fast the rise takes place with relation to the initial sensitivity. The ideal condition is achieved when the falling of the cooling factor would be fully compensated for by the increase of the temperature sensitivity for a very wide range of fluid flow. In this case, when the resistor is cooled down to 75° C., for example, that is, to half way of the initial temperature difference between the resistor and fluid temperatures, the temperature sensitivity S of the resistor will have been doubled or increased by 100% of its original value.

In order to meet the requirement for a practically acceptable range width (having at least a 5 to 1 ratio of top to bottom) I have concluded from my research and tests, that the temperature sensitivity of a resistance element must have, when the resistor is cooled to the halfway temperature between its initial temperature and the fluid temperature, an increment which is at least 20% of the sensitivity at the initial temperature.

I have developed additional ways and means both of an electrical and aerodynamical nature to increase the width of the useful range and the linearity of response which will be described hereinafter. But, first another phase of the invention will be described, without which the use of the semi-conductors for anemometers and flowmeters would have been impossible.

When the fluid is set into motion and the detector is cooled, the electric meter in the bridge circuit is deflected from its zero position to an extent depending on the fluid velocity. However, even if the fluid flow is instantly raised to a value, which then remains constant, it takes some time before the meter pointer comes to rest and a reading can be made. This lag in indication depends on the mass $m$ of the detector element, the area of its cooling surfaces $s$, the specific heat of the material—C, its, so-called, external heat conductivity $h$ (loss of heat per second through a unit of area of the external surface at a temperature gradient of 1° C.). The equation governing these quantities is:

$$h(T-\theta)s\Delta\alpha = -cm\Delta T \qquad (1)$$

when the body is cooled from an initial temperature $T$ to $T-\Delta T$ in a time interval $\Delta\alpha$ by a fluid whose temperature is $\theta$. From this equation it may be deduced that:

$$\frac{\Delta\alpha}{\Delta T} = -\frac{cm}{hs}\frac{1}{T-\theta} \qquad (2)$$

From this it may be deduced that the time lag for the same amount of cooling at the same initial and fluid temperatures, will be proportional to the quantity:

$$\frac{cm}{hs} = \frac{cv\rho}{hs} = \frac{c\rho}{h}\frac{v}{s} \qquad (3)$$

where $v$ is the volume, $s$ the surface area, and $\rho$ the specific gravity of the conductor of mass $m$ used as the detector element.

I have compiled from tables the values for $c$ and $\rho$ (specific heat and specific gravity) for a number of materials of which the semi-conductors are made, and by forming the product $c\rho$ for each I have found that the values of $c\times\rho$ for these materials varies not more than 25% from an average value of .85 cal./cm.³/° C.

The quantity $h$, which is a combination of the heat transfer coefficient from the solid to the fluid and the heat conductivity of the material, is exactly the same for all resistors of the same material. It might appear apriori that this quantity would vary considerably from one material to another. However, I have found in my experiments that resistors of the same size and shape and surface treatment made of different materials vary in the time lag of indications not more than 50% of an average. This is probably accounted for by the fact that the heat loss from the surface, when the surface is treated—as usually is the case—with the same kind of varnish and is immersed in the same fluid is dependent mostly on the heat transfer coefficient and only to a minor degree upon the internal heat conductivity of the material of the conductor. Thus, it becomes possible to treat the quantity $c\rho/h$ in Equation 3 to a first approximation as a constant, and to establish a maximum requirement for the dimensions of a semi-conductor, which is to be used as a detector element. I have found that when the ratio of the surface of a semi-conductor element exposed to the moving fluid to the total volume of the element is 20, when centimeters are used as unit of length area and volume or 50 when inches are used, a lag of the order of 30 seconds is obtained for the worst materials and of 15 seconds for the best. Since an anemometer or flowmeter with a lag of over 30 seconds would scarcely be acceptable, the above ratio is considered as a lower limit. This limit or minimum requirement is independent of size, shape, material, etc., of the semi-conductor element used as a detector in a flowmeter, anemometer, or a similar application.

In case elements of the shape of cylindrical rods of radius $r$ are used, which are immersed lengthwise in the fluid stream the ratio $s/v$ reduces to $$\frac{2\pi rl}{\pi^2 r^2 l} = \frac{2}{r}$$

which must be $$> \frac{20}{cm} \text{ or } \frac{50}{\text{inches}}$$

Hence in this case $r$ must be less than 1 mm. or .040" for an element with the best heat conductivity and considerably smaller (down to about .020") for a material with the worst heat conductivity.

In planning the use of an element of a new material, since heat conductivities are mostly unknown and hard to measure, it is useful to remember that heat conductivities are closely related to electrical conductivities: for metals there is the well known relationship according to the law of Franz and Wiedeman; the investigations of the inventor has shown, that for semiconductors there is at least qualitatively a similar relationship, and that semiconductor materials with high electrical conductivities have also high thermal conductivities and vice versa.

Hence, since the specific electrical resistance of a material is usually known or can be easily determined, it is possible to express the above rule for the minimum practical dimensions in a somewhat more specific form: namely, the ratio of surface to volume must be 20 or more (in centimeter units) and 50 or more (in inches) for material with the lowest specific electrical resistance (highest electrical and heat conductivity), and must be respectively more than 40 or 100 for materials with the largest specific electrical resistance; obviously, for materials with specific resistances between said limits, the ratio must have a minimum value between the above two in accordance with the divergence of its specific resistance from the highest and lowest values.

The anemometer or flowmeter to which the system of my invention is applied is shown at 100 and having an intake at 101 and a discharge at 109. The intake 101 leads through a valve housing 102 that houses control valve 102′ to intake 103 to the enlarged chamber 104 within which the temperature sensitive or high temperature coefficient resistor elements 11, 12, 13 and 14 are immersed in the fluid flow. Detector element resistor 4 is located in the intake 103. The discharge end of the chamber 104 leads through a restriction 105 to the discharge pipe 106. A by-pass pipe 108 leads from the valve housing 102 to the discharge pipe 106 and connects thereto at 107 from which a conjoint discharge pipe leads to the discharge 109. The Wheatstone circuit bridge is made up of constant resistances 3, 20, 21 and 63, a battery or another power supply 60, a sensitive electrical meter 50 to indicate balance and degree of out of balance, a rheostat 62 in the power supply line to control the current through and/or voltage applied to the entire balanced circuit and thus also to the detecting conductor and a rheostat 22 in some part of the balanced circuit, such as around resistance 21, to adjust the indicating meter 50 to zero, or in other words to adjust the circuit to balance. The indicating meter 50 is provided with an adjustable shunt 51 therearound. Electrical connections are established to the immersed resistors 4, 11, 12, 13 and 14 through circuit path 80—81 as shown.

The operation of the compensator 11—14—34 in the arrangement shown is based on the folowing facts:

(1) That each of the four elements receives only 1/16 of the power supplied to the detector element, and therefore is heated only a few degrees above ambient;

(2) That they are located in a widened portion of the flow system and therefore subjected to a fluid flow which is much smaller than that around the detector, the fluid flow being substantially in inverse proportion to the area;

(3) That they are placed near the wall of the conduit, where the fluid flow is only a very small fraction of the flow near the axis, and (4) The elements 11, 14, thus substantially not being cooled at all by the motion of the fluid, change their temperature only in concordance with the temperature variation of the fluid.

In the drawings an arrangement is shown for varying the power input to the detector element 4 and/or to the balanced circuit substantially in proportion to the fluid flow. In the chamber or flow tube 104 containing the detector element 4 and the compensator consisting of the high temperature coefficient resistors 11, 12, 13 and 14, I arrange a pivotally mounted vane 201, which is more or less deflected by the fluid flow from the normally vertical position. To the continuation of the spindle 202 of this vane 201, protruding through the wall of the chamber or flowtube 104 one or more rotary elements 203 of a variable condenser are connected. The flow thus changes the relative position of the rotary plates 203 of the variable condenser with respect to the stationary plates 204. The resulting change in capacity activates amplifier 205 to deliver an increased amount of power through output leads 209 and 210 to the bridge circuit.

The foregoing arrangement is described only for the purpose of illustration of the underlying ideas; numerous variations will occur to those skilled in the art; for instance, other forms of flow sensing elements may be used in place of the vane; the electric power controlled by the nonelectric flow sensitive element may be applied to a part of the bridge instead of to the entire bridge; instead of changing the power input to the bridge or a part thereof, another electric parameter of the bridge may be varied; an electric system other than a Wheatstone bridge circuit may be used, etc. Therefore, no limitations to this invention concept shall be imposed other than those stated in the claims.

When using this device as an anemometer, that is to measure the velocity of air surrounding the observer as well as the instrument, it is ordinarily sufficient to employ the usual means of temperature compensation, consisting of a resistor identical to the one used as a detector element and placed in an adjacent bridge arm, such as resistor 3, connected in parallel with the detector 4 as shown. In this case the fluid, that is, air, is supposed to have the same temperature as all the ambient air and the compensator being in the same ambient air will assume a higher or lower temperature corresponding to the temperature of that air, and thereby when the bridge is being balanced have the detector also adjusted to the prevailing change of ambient temperature. However, if the device is used as a flowmeter, then the moving fluid may have a temperature quite different from the ambient temperature. In order to compensate for the changes in fluid temperature I provide a second compensator; this consists in the negative temperature coefficient resistors 11, 12, 13, and 14, of substantially the same resistance and resistance temperature characteristics as the detector 4 and first compensator 3. They are connected in parallel to each other and the entire group in series with the detector element 4, and they are inserted also in the fluid flowpath. It is apparent that at bridge balance and for the relatively small unbalance currents used, each of these resistors will have applied to it only about 1/4 of the current passing through resistor 4. The current through the four resistors 11–14 in parallel is approximately 1/4 the total current and each of the resistors 11–14 receives only about 1/16 of the power. Therefore, they will be heated by the electric current only slightly. If now the fluid temperature is higher than the one at which the original calibration was made, these resistors will be heated, their resistance will decrease, and this will cause the detector 4 to be also at a lower resistance, that is, at a higher temperature, when the bridge is adjusted to balance. Thus, the difference in temperature between the detector and the fluid will be maintained substantially the same as at the original calibration irregardless of what the fluid temperature will be—within certain limits. The calibration is substantially determined by this temperature differential, rather than by the absolute temperatures.

It will be apparent to those familiar with this art that in place of the several resistors used in this, the compensator, a single resistor of larger size or of a very much different material can be used, the substantial requirement being that these compensator elements should not be heated appreciably by the bridge currents. However, in view of the time lag and other practical considerations I have shown in the preferred arrangement several small size resistors of the same general characteristics as the detector 4 and the first compensator 3.

I have found the measuring system of my invention highly practical and efficient in operation and while I have described my invention in one of its preferred embodiments I realize that further modifications may be made and I desire it to be understood that no limitations

What I claim as new and desire to secure by Letters Patent of the United States is as follows:

1. In a system for measuring the rate of motion of a fluid, a conduit for directing the flow of a fluid, a temperature sensitive electrically heated detecting resistor located in one portion of said conduit, a number of temperature sensitive resistors each variable in effective resistance in accordance with the temperature thereof submerged in another portion of said conduit spaced away from the aforesaid resistor and disposed in the path of fluid flow, an electrical circuit including a potential source and having separate arms one of which includes said first mentioned temperature sensitive detecting resistor and another of which said number of temperature sensitive resistors, means for indicating changes in effective values of the resistances of said resistors according to cooling produced by motion of fluid flowing around said resistors, an angularly movable vane arranged in said conduit, a control shaft connected to said vane and extending externally of said conduit, means for additional heating of said detecting resistor and means for controlling the amount of said additional heating by said control shaft substantially in proportion to the angular deflection of said vane and shaft from their position in quiescent fluid, to compensate for the decrease of the rate of cooling of said detecting resistor with increase of fluid flow.

2. In a system for measuring the rate of motion of a fluid, a conduit for directing the flow of a fluid, a temperature sensitive electrically heated detecting resistor located in one portion of said conduit, a number of temperature sensitive resistors each variable in effective resistance in accordance with the temperature thereof located in another portion of said conduit spaced away from the aforesaid resistor and located in the path of fluid flow, an electrical circuit including a potential source and having separate arms one of which includes said first mentioned temperature sensitive detecting resistor and another of which said number of temperature sensitive resistors, means for indicating changes in effective values of the resistances of said resistors according to temperature decrease thereof produced by motion of fluid flowing around said resistors, an angularly movable vane located in said conduit, a shaft connected with said vane and extending externally of said conduit, and a variable impedance device controlled by said shaft for continuously controlling the effective potential impressed upon said detecting resistors to compensate for the decreasing rate of temperature lowering with increasing fluid flow.

3. In a system for measuring the rate of motion of a fluid, a conduit for directing the flow of a fluid, a temperature sensitive electrically heated detecting resistor located in one portion of said conduit, a number of temperature sensitive resistors each variable in effective resistance in accordance with the temperature thereof located in another portion of said conduit spaced away from the aforesaid resistor and disposed in the path of fluid flow, an electrical circuit including a potential source and having separate arms one of which includes said first mentioned temperature sensitive detecting resistor and another of which said number of temperature sensitive resistors, means for indicating the effective values of the resistances of said resistors according to temperature lowering thereof produced by motion of fluid flowing around said resistors, a deflectable vane mounted in said conduit, a shaft connected with said vane and extending externally of said conduit, a variable capacity controlled by the movement of said shaft, and means operated by the variation of said variable capacity for increasing the effective potential supplied to said electrical circuit and to said detecting resistor to compensate for non-linearity of response with increased fluid flow.

4. In a system for measuring the rate of flow of a fluid, an electrical system including an electrical indicator, a main flow sensing element subjected to the fluid flow, and connected in said electrical system, an auxiliary nonelectrical flow sensing element subjected to substantially the same fluid flow, means for varying a parameter of said electrical system, means for controlling said parameter substantially in proportion to the variations of said nonelectrical flow sensing element, and electrical circuit connections between said variable parameter and said electrical system for equalizing the differential increments in the response of said indicator in said electrical system at high flow levels with those at low flow levels.

5. In a system for measuring the rate of flow of a fluid, an electrical system including an electrical indicator, a fluid flow conduit, a main flow sensing element in said conduit exposed to the fluid flow and connected in said electrical system, a nonelectric flow sensitive element exposed to the fluid flow through said conduit, means for varying a parameter of said electric system, a linkage between said nonelectric flow sensing element and said parameter adapted to vary the said parameter substantially in proportion to the variations of said nonelectric sensing element and in such direction as to equalize the response of said electrical system with respect to said main flow sensing element at high flow levels with that at low flow levels.

6. In a system for measuring the rate of flow of a fluid, an electrical system including an indicator, a fluid flow conduit, a main flow sensing element in said conduit exposed to the fluid flow and connected in said electrical system, an auxiliary nonelectrical flow sensing element, means for varying a parameter of said electrical system, a mechanical linkage between said nonelectrical flow sensing element and said parameter varying means to cause the parameter variation to take place substantially in proportion to the variations of said sensing element and in a direction in which the differential increments in the response of said electrical system to said main flow sensing element at high flow levels are equalized with those at low levels.

References Cited in the file of this patent

UNITED STATES PATENTS

| | | |
|---|---|---|
| 1,449,437 | Obermaier | Mar. 22, 1923 |
| 1,934,948 | Perrine | Nov. 14, 1933 |
| 2,650,496 | Middleton et al. | Sept. 1, 1953 |
| 2,729,976 | Laub | Jan. 10, 1956 |